(No Model.)
J. G. BAKER.
PIPE AND ROD VISE.
No. 342,992. Patented June 1, 1886.
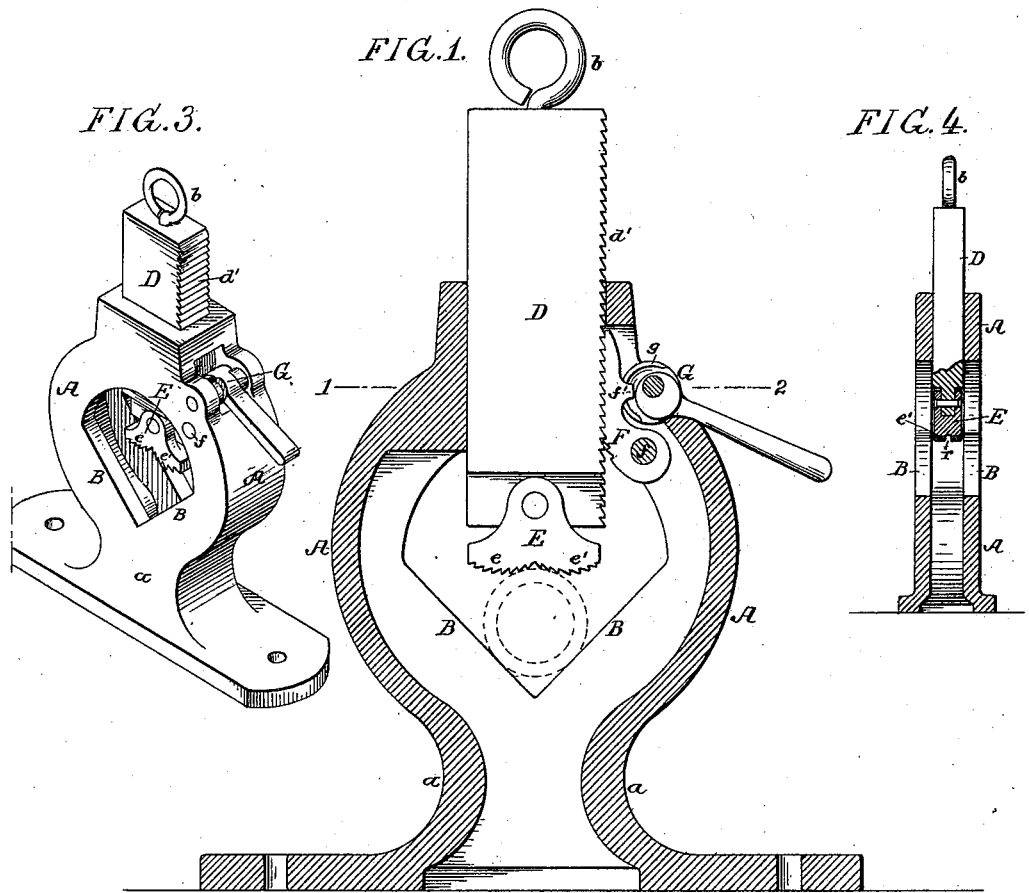
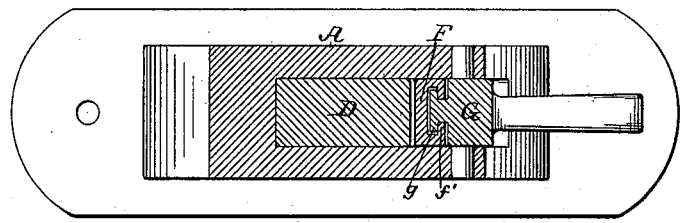
Witnesses:
John E. Parker
William D. Conner
Inventor
Joseph G. Baker,
by his Attorneys,
Howson and Sons

UNITED STATES PATENT OFFICE.

JOSEPH G. BAKER, OF FERNWOOD, PENNSYLVANIA.

PIPE AND ROD VISE.

SPECIFICATION forming part of Letters Patent No. 342,992, dated June 1, 1886.

Application filed March 29, 1886. Serial No. 196,957. (No model.)

*To all whom it may concern:*

Be it known that I, JOSEPH G. BAKER, a citizen of the United States, residing in Fernwood, Delaware county, Pennsylvania, have invented certain Improvements in Pipe or Rod Vises, of which the following is a specification.

The object of my invention is to construct a simple but strong and effective vise for gripping pipes, rods, and similar articles.

In the accompanying drawings, Figure 1 is a vertical section of my improved pipe or rod vise. Fig. 2 is a sectional plan on the line 1 2, Fig. 1. Fig. 3 is a perspective view of the device on a smaller scale; and Fig. 4 is a vertical section on the same scale and at right angles to the section Fig. 1.

The frame of the vise is preferably in the form of a casting, and it consists of a yoke-shaped body, A, mounted on a stem, a, with a flattened base for application to the workbench. On this yoke-shaped body are formed the V shaped jaws B B of the vise, and in the upper part of the frame is formed a vertical opening for the reception and guidance of a block, D, which carries at its lower end the pivoted gripping-jaw E, and is provided at its upper end with a hook or handle, b, for the manipulation of the block D when it is desired to raise it to free the pipe or other object from the vise. On one side of the sliding block D are formed ratchet-teeth d', which are adapted to engage with a toothed locking-pawl, F, pivoted at f to the frame or yoke A, and acted on at its rear by a handled cam, G, also pivoted to the yoke or frame, so that by the action of this cam the locking-pawl F may be caused to engage therewith.

To facilitate the freeing of the locking-pawl F from the rack on the block D, I connect the cam and pawl so that the pawl will move back with the cam. For this purpose I form on the cam G flanges g, which form a T-head and engage with hooks or fingers f' on the pawl, so that by the manipulation of the cam through its handle the pawl will always follow the movement of the cam away from the block D as well as toward it.

The pivoted gripping-jaw at the lower end of the block D is provided with two sets of teeth, e and e', facing in opposite directions, so that, no matter in which direction the strain on the pipe or other object may be, the latter will be always firmly gripped by the jaw; and I form these toothed faces e and e' curved, as illustrated in Fig. 1. To insure a better grip on the pipe, I cut longitudinal or cross grooves r in the gripping-face e', as illustrated in Fig. 4, for I find that by severing the continuity or length of the teeth by means of the grooves r I obtain a more effective grip on the object to be held in the vise.

It will be observed on reference to Figs. 1 and 3 that the inclined faces of the ratchet on the sliding block are on the upper side, and that the teeth on the pawl F correspond therewith. When, therefore, the block has been allowed to descend onto the pipe or other object, and the locking-pawl is then forced by its cam into engagement with the ratchet-teeth of the block D, the gripping-jaw E will thereby be forced down onto the object to be gripped.

I claim as my invention—

1. The combination of the frame or yoke, having jaws B, with a movable block, D, carrying a gripping-jaw and having ratchet-teeth, with a locking-pawl pivoted to the yoke or frame, to engage with said ratchet-teeth, and a cam to act on the pawl, all substantially as specified.

2. The combination of the yoke or frame, the sliding block D, having a gripping-jaw and ratchet-teeth, with a locking-pawl to engage with the teeth, a cam to act on the pawl, and connected with the latter to move it from as well as toward the ratchet, substantially as set forth.

3. The combination of the yoke or frame, having jaws B, with a block having a pivoted gripping-jaw provided with two curved and toothed gripping-faces, substantially as described.

In testimony whereof I have signed my name to this specification in the presence of two subscribing witnesses.

JOSEPH G. BAKER.

Witnesses:
WILLIAM D. CONNER,
HARRY SMITH.